April 3, 1956   C. F. CRAM ET AL   2,740,937
METHOD AND APPARATUS FOR TESTING COILS
Filed Nov. 15, 1952
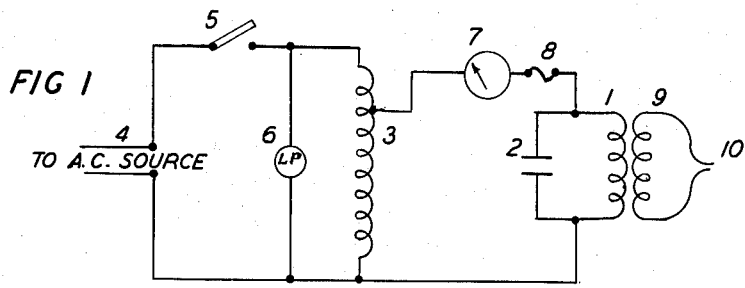
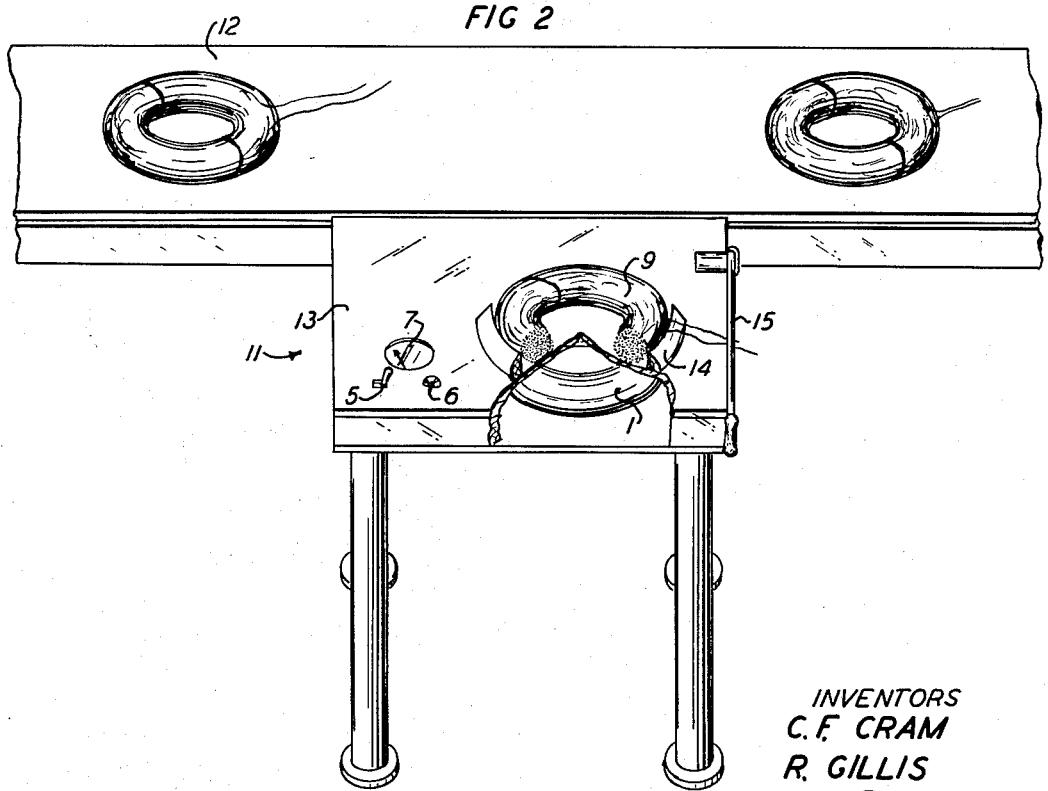
INVENTORS
C. F. CRAM
R. GILLIS
BY
ATTORNEY

United States Patent Office 2,740,937
Patented Apr. 3, 1956

2,740,937
METHOD AND APPARATUS FOR TESTING COILS

Charles F. Cram, Tonawanda, and Randall Gillis, Eggertsville, N. Y., assignors to Western Electric Company, Incorporated, New York, N. Y., a corporation of New York Application November 15, 1952, Serial No. 320,734

2 Claims. (Cl. 324—51)

This invention relates to a method of and apparatus for making continuity tests on coils of insulated electrical wire.

In the manufacture of insulated electrical wire, there has been a particular need for a method and apparatus for making a quick continuity test on coils of the insulated wire that would not require the use of ring-out probes or knife-edge clips which have been used heretofore and which left the ends of the tested conductors contaminated and damaged.

It is, therefore, the principal object of the invention to provide a method and apparatus for making a quick and simple continuity test on coils of insulated wire.

In accordance with the present invention, coils to be tested are moved successively into the field of a coil supplied with alternating current through an ammeter and while in the field, each coil is momentarily short circuited, as by simultaneously clipping off the two ends. The current induced in a short circuited coil produces a momentary change in the ammeter reading; but if the coil under test is open, clipping its ends does not affect the current in the test coil.

In the preferred embodiment a coil is mounted on the underside of an insulating plate and is energized from an alternating current source. The coil is partially tuned by a condenser connected in parallel with it. The coils to be tested are moved successively into position on the topside of the insulating plate into the field produced by the energized fixed coil. While in this position each coil is momentarily short circuited while an observation is made of an ammeter in series with the partially tuned coil for a change in deflection. The short circuiting is conveniently effected by merely clipping off the two ends of the coil simultaneously with appropriate cutting means. An advantage of utilizing cutting means for short circuiting the coil is that the ends of the coil are left cleanly cut and undamaged after the test.

While tuning the fixed coil is not essential to the operation of the system, it has been determined empirically that by tuning the coil to a frequency close to, but other than, the frequency of the energizing source, the sensitivity of the system as observed from the change in ammeter deflections is increased appreciably while the standby current in the coil is reduced.

Other objects and features of the invention will be more readily understood from the following detailed description when read in conjunction with the accompanying drawing, in which:

Fig. 1 is a simplified schematic diagram of a circuit utilizing the principles of the invention;

Fig. 2 is a perspective view showing the test apparatus mounted adjacent the conveyor carrying the coils of wire.

Referring now to Fig. 1, a tuning condenser 2 is connected in parallel with test coil 1, which may be of the type being tested. This parallel arrangement is energized from autotransformer 3 through circuit connectors including milliammeter 7 and protective fusing 8. The autotransformer 3 is energized from an alternating current source 4 of 110 volts and 60 cycles per second through a switch 5. A lamp 6 is connected across the autotransformer to indicate when the test device is ready for use. A coil of wire 9 to be tested is placed in the field of the test coil 1 so that there will be transformer action between the two coils when the coil being tested is short circuited.

The value of the capacitance 2 is determined by alternately open and short circuiting a coil located in test position while varying the capacitance 2 across the energized test coil 1. The optimum capacitance will be that value which results in maximum percent change in the current through the ammeter between the open and short circuited conditions. As pointed out above, it has been ascertained empirically that this results in tuning the test coil to near resonance.

Fig. 2 shows a test bench 11 on which the principal circuit components, as described above in connection with Fig. 1, are mounted and which for convenience of production testing is located adjacent conveyor 12 carrying the coils to be tested. The fixed or primary coil 1 is mounted on the underside of an insulating plate 13, the topside of which is level with the conveyor 12. A curved guide or stop 14, against which a coil being tested is positioned, is provided to insure its proper alignment in the field of the energized test coil 1. A pivoted knife blade wire cutter 15 is fixed to the side of the bench and the "On-Off" switch 5, the indicator lamp 6 and the ammeter 7 are conveniently mounted on the plate 13 for observation by the test set operator. With the test set energized, coils to be tested are simply slipped from the conveyor 12 against the guide 14; the ends of the conductor, which have been brought out from the coil in a prior operation, are short circuited by clipping with the cutting means 15 (which leaves the ends cleanly cut, uncontaminated and unbroken) and if a deflection is observed on the ammeter 7, indicating continuity of the coil, it is slipped back on to the conveyor for subsequent processing.

While the invention has been described with respect to a particular embodiment for purposes of illustration, it will be understood that the system shown could be modified in various ways in accordance with the general principles of the invention and the requirements of the particular conditions of use. For example, the test coil need not be fixed to the bottom side of an insulating plate but may be located in any convenient place and position so long as the coil to be tested is in its field for test; therefore, it may even be located such that the coil need not be moved off the conveyor during the test. In addition, an iron core may be provided for the fixed test coil in order to concentrate the magnetic field and thereby increase the sensitivity of the system. Also, it may be desirable to short circuit and clip the ends of the coil with hand pliers instead of with the pivoted knife blade. These and numerous other arrangements may be devised by those skilled in the art without departing from the spirit and scope of the invention.

What is claimed is:

1. Coil continuity test apparatus for a conveyor system having a moving belt for carrying coils to be tested comprising a main support member having a horizontal coil receiving portion adjacent and at the same elevation as the conveyor belt to permit sliding coils between the conveyor and the coil receiving portion, a stop member for the receiving portion for positioning coils from the conveyor thereon, a test coil mounted on the support member beneath the receiving portion, an energizing circuit for the test coil including a source of alternating current, cutting means for short circuiting a coil in the receiving portion and means for detecting a change in current in the test coil when a coil in the receiving portion is short circuited.

2. Coil continuity test apparatus for a conveyor system having a moving belt for carrying coils to be tested comprising a main support member having a horizontal coil receiving portion adjacent and at the same elevation as the conveyor belt to permit sliding coils between the conveyor and the coil receiving portion, an arcuate stop member for the receiving portion for positioning coils from the conveyor thereon; a test coil mounted on the support member beneath the receiving portion; an energizing circuit for the test coil including a source of alternating current, cutting means for short circuiting a coil in the receiving portion, a condenser connected across the test coil tuned to resonate with the coil at a frequency close to the frequency of the source that results in a maximum change in current through the coil between open and short circuited conditions of a coil being tested and an ammeter in the energizing circuit for the test coil for detecting a change in current therein.

References Cited in the file of this patent

UNITED STATES PATENTS

| | | |
|---|---|---|
| 556,646 | Scott | Mar. 17, 1896 |
| 1,373,383 | Couch | Mar. 29, 1921 |
| 1,462,572 | Gravell | July 24, 1923 |
| 1,676,195 | MacWilliams | July 3, 1928 |
| 1,908,272 | Sommer | May 9, 1933 |
| 2,572,908 | Brenholdt | Oct. 30, 1951 |